3,460,327
APPARATUS FOR HARVESTING FRUIT
Wallace J. S. Johnson and Robert E. Fisher, Berkeley, Calif., assignors to Up-Right, Inc., Berkeley, Calif., a Corporation of California
Filed July 11, 1966, Ser. No. 564,084
Int. Cl. A01g 19/00
U.S. Cl. 56—328                                     8 Claims

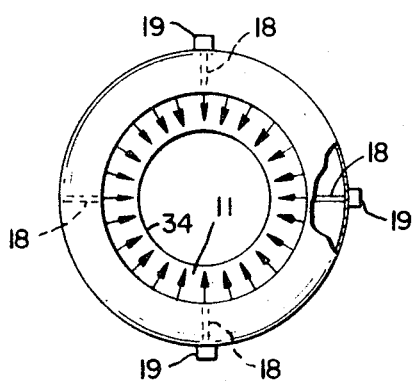
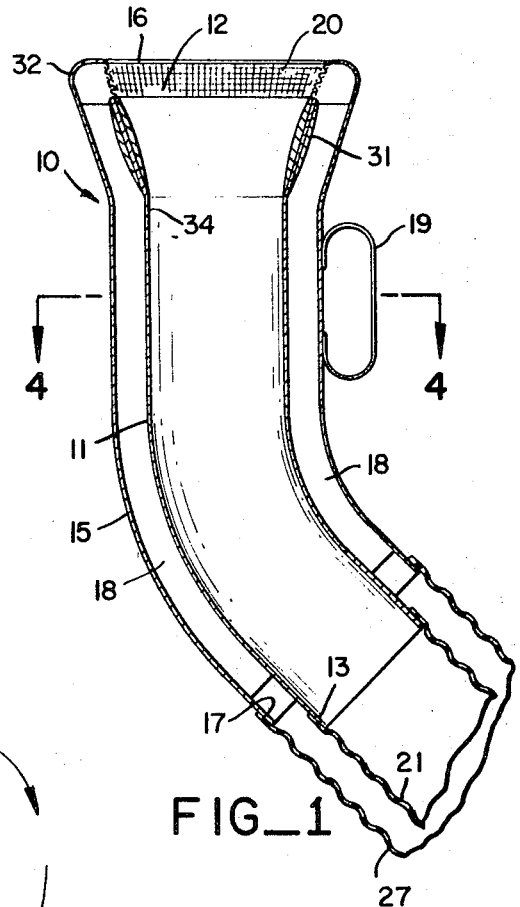
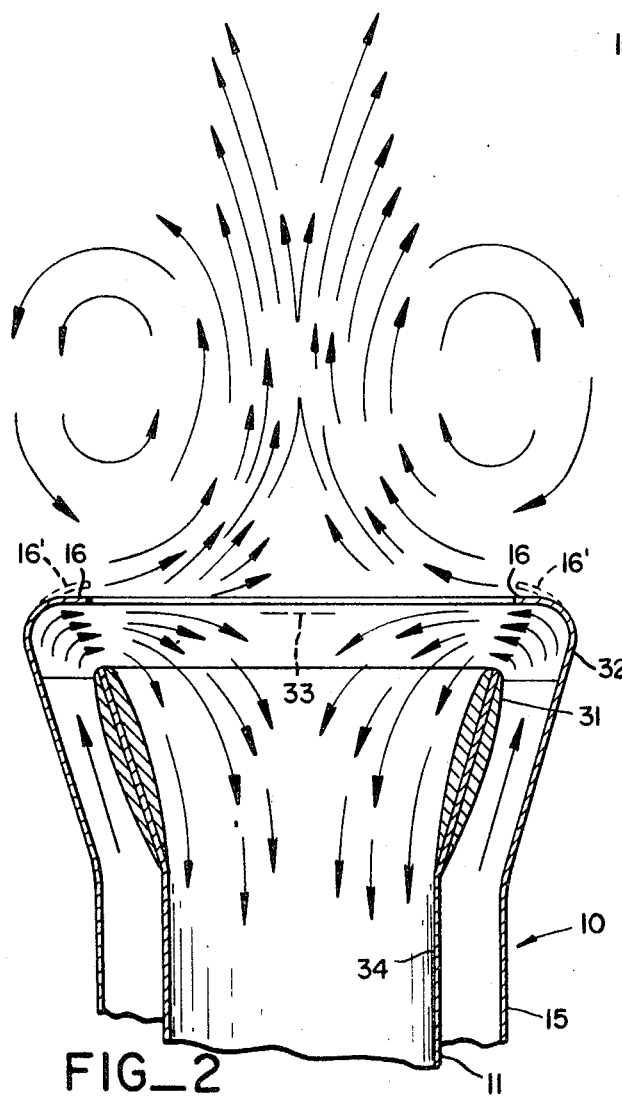
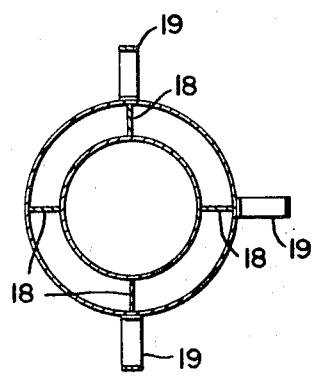
Aug. 12, 1969 — W. J. S. JOHNSON ET AL — 3,460,327
APPARATUS FOR HARVESTING FRUIT
Filed July 11, 1966 — 2 Sheets-Sheet 1
FIG_1
FIG_2
FIG_3
FIG_4
INVENTORS
WALLACE J. S. JOHNSON
ROBERT E. FISHER
BY Mellin, Moore & Weissenberger
ATTORNEYS

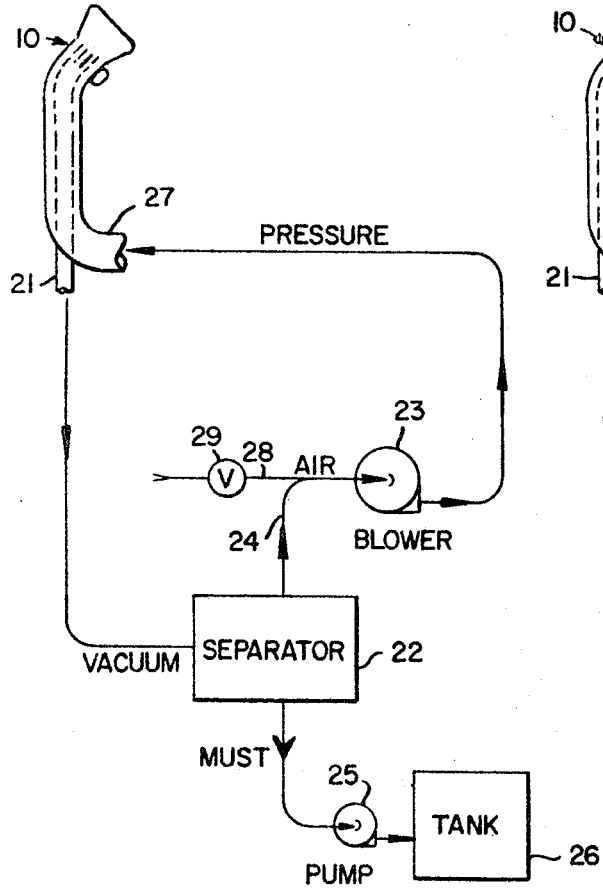
FIG_5
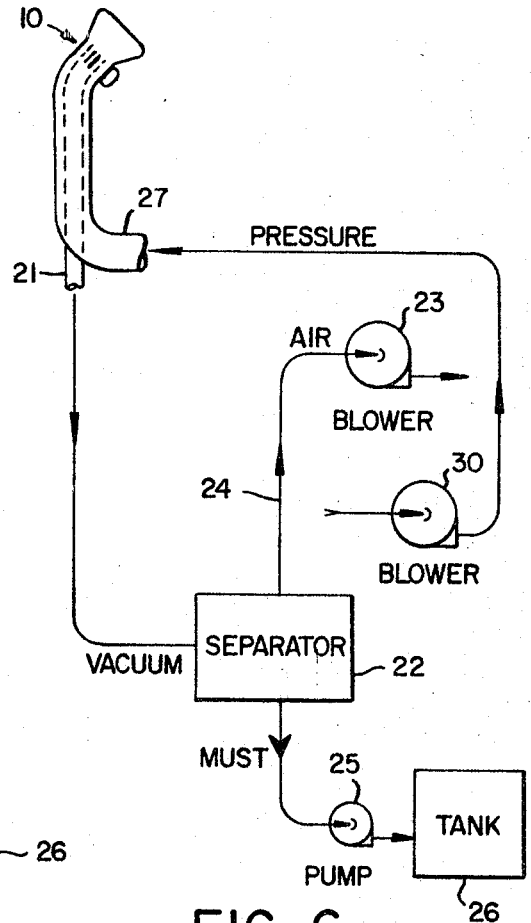
FIG_6
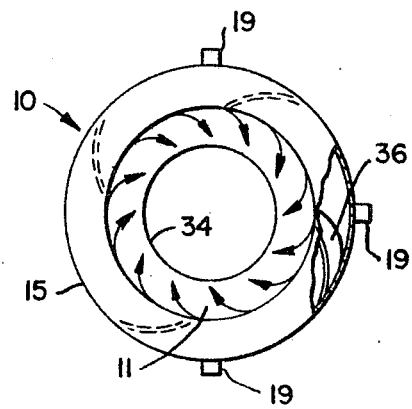
FIG_8
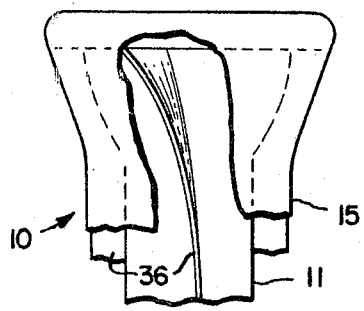
FIG_7
INVENTORS
WALLACE J.S. JOHNSON
ROBERT E. FISHER
BY
*Mellin, Moore & Weissenberger*
ATTORNEYS

United States Patent Office 3,460,327
Patented Aug. 12, 1969

ABSTRACT OF THE DISCLOSURE

Apparatus for pneumatically harvesting fruit, in which there is a picking nozzle with an open-ended suction tube and an air-directing shroud surrounding the suction tube. Air under pressure is supplied to the shroud at a volume rate of flow greater than the volume rate of flow of air sucked through the suction tube and in such manner that no external air from around the nozzle will enter the suction tube. Accordingly, the nozzle will exert a suction only on object physically inserted into the open end of the suction tube.

---

This invention relates to the pneumatic picking of fruit. Although cherries, olives, peaches, apricots, plums, prunes and other fruit can be picked in the manner described below, it is expected that a major use of the invention will be for the picking of grapes.

Work has been carried on for some time in the development of pneumatic grape-pickers, and reference is made to the United States Patent No. 3,233,396, issued to Joseph E. Gallo on Feb. 8, 1966, as a disclosure of a method and apparatus developed by the E. & J. Gallo Winery for harvesting grapes, which has been under development since 1961. In the Gallo patent, the fruit-picking nozzle 44 is a simple tube which is moved towards the grapes and through which a suction of air pneumatically picks grape berries from the vine. In actual operation by the Gallo Winery, the suction tube has been found by them to be very successful in removing the grapes from the vines. However, the same suction that pulls the grapes from the vines also sucks in a large amount of leaves and stems of the plant. The inrushing air literally destroys the green portions of the leaves by pulling them off in minute green patches, leaving behind the petiole and the veinal framework of the leaves on the cane. The ruptured cells release their chlorophyl, making the must (the crushed grape berries in the semi-liquid form prior to fermentation) unacceptable for winemaking.

This condition was realized in 1962, and every idea broached by the Gallo Winery to prevent the admission of leaves to the nozzle was tried without success. Additionally, many efforts were attempted to build a separator which would be effective to separate the sucked-in leaves and grapes. One separator was constructed that gave a satisfactory separation of fruit and leaves, but this was successful at only one period during the harvest of a variety with a firm pulp and resistance of juicing. When this separator was tried on other wine varieties, those which burst and juiced easily, it did not perform satisfactorily.

During the 1964 season, defoliants were used in an attempt to save the leaves beyond the bunches. All known defoliants were tested, plus fertilizers having a defoliant action. A butane flame-thrower was tried to sear the petioles and leaves. Again, none of these attempts were successful.

The 1965, grape season came and passed with no satisfactory solution to the separation of the leaves from the grapes.

During these past five years, the remainder of the Gallo pneumatic grape harvester has been developed and refined to a point where all that is necessary to make it a complete success is a satisfactory method of separating the leaves from the grapes.

The principal object of the present invention is to provide a method and apparatus for the pneumatic picking of grapes and other fruit "berries," either as bunches or individually, without simultaneously picking leaves or other contaminants. That is, the principal object of the invention is to separate leaves from fruit in a vacuum picking operation as the fruit is picked.

Another object of the invention is to provide a method and apparatus whereby fruit may be cleaned with a blast of air to remove dust, leaves, insects, and other foreign matter from the fruit just prior to being picked.

Another object of the invention is to provide a method and apparatus wherein the fruit, for example a bunch of grapes, can be removed in such a manner that the stems will remain on the tree or vine and therefore need not be removed from the fruit at a later time, or in which, if desired, the whole bunch of fruit with stems included may be picked.

Still another object of the invention is to provide a pneumatic picking nozzle which will be much safer than the suction nozzle shown in the above-referred-to Gallo patent.

In general, the objects of the invention are accomplished by the use of a nozzle which has an inner tubular suction member, which is surrounded by a tubular shroud. Air is blown through the shroud at a rate such that the flow of pressure air is at least equal to the flow of suction air through the suction member, and in such a manner that no external air from around the shroud enters the suction member. In this manner, the nozzle will not suck in any objects, e.g., grapes or leaves, that are next to the end of the nozzle. However, if the nozzle is now manipulated so that the bunch of grapes to be picked is moved into the throat of the suction member, the suction will then pull the grapes off their stems without acting on anything, e.g., leaves, which remains outside of the suction member. Additionally, if the pressure volume is greater than the suction volume, then there will be a resultant blast of air directed out from the nozzle which will impinge upon the fruit as the nozzle is moved towards the fruit so that dust, leaves, insects, and so forth, are blown off the fruit immediately prior to picking.

Other objects and advantages will become apparent in the course of the following detailed description.

In the drawings, which form a part of this application:
FIG. 1 is a central sectional view of a fruit-picking nozzle constructed in accordance with the invention.
FIG. 2 is an enlarged sectional view of the end of the nozzle of FIG. 1 illustrating the manner in which the air flow in the nozzle creates a null pressure interface adjacent the open end of the suction member.
FIG. 3 is an end view of the nozzle of FIG. 1 illustrating the flow of air from the open end of the nozzle shroud.
FIG. 4 is a sectional view of the nozzle of FIG. 1, taken on line 4—4 thereof.
FIG. 5 is a digrammatic illustration of a fruit-harvesting apparatus employing the principles of the present invention.
FIG. 6 is a diagrammatic illustration of a modification of the invention to produce a desired air flow through the nozzle.
FIG. 7 is a sectional view of the open end portion of a modified form of a nozzle constructed in accordance with the invention.
FIG. 8 is an end view of the nozzle of FIG. 6, illustrating the direction of the flow of air discharging from the open end of the shroud of said nozzle.

Referring now to the drawings, the nozzle 10 illustrated in FIGS. 1–4 comprises an inner tubular suction member 11 having an open end 12 and a suction end 13, and an outer tubular shroud 15 having an open end 16 and a pressure end 17. The shroud 15 is mounted coaxially on the suction member 11 and radially extending vanes 18 are disposed between and spaced around the suction member and the shroud to assist in giving a uniform air flow through the shroud. Handles 19 are provided on the exterior of the shroud so that the nozzle may be easily manipulated by a workman. If desired, a coarse screening 20 is disposed around the open end of the shroud.

The suction end 13 of the suction member 11 is connected by means of a flexible reinforced pressure hose 21 to the inlet of a centrifugal separator 22, which separator is maintained at a subatmospheric pressure by means of a pump or blower 23, the inlet of which is connected by conduit 24 to the separator 22. As a mixture of fruit and air is delivered to the separator 22 from the nozzle, the fruit will drop down and be conveyed by suitable means, as for example pump 25, to the storage tank 26, while the air exhausts from the separator through conduit 24. The outlet of blower 23 is then connected to the flexible reinforced pressure hose 27 which is connected to the pressure end 17 of the shroud 15.

As will be discussed below, it is necessary to have at least as great a volume of flow through the nozzle shroud as through the suction member. One manner of achieving this is shown in FIG. 5, wherein a conduit 28, open to atmosphere and valved by valve 29, provides make-up air to blower 23. The valve 29 can be adjusted so that the air blown into the shroud 15 is the same or greater, as desired, than the air taken into the system through the suction member 11. In such an arrangement, the air is cycled continuously through the system, with most of the air blown through the shroud being returned by the suction member to the separator 22 and blower 23. This arrangement, while being relatively inexpensive since only one blower is needed, will cause the temperature of the air in the system to rise, due to the continual repressuring of the recirculated air by the blower. In grape-harvesting, this temperature increase may be undesirable because it could cause premature fermentation of the grapes.

An alternative system is shown in FIG. 6, wherein blower 23 again has its intake connected to the separator 22, but this time the blower exhausts to atmosphere. A second blower 30 has its intake open to atmosphere and blows air into the hose 27 and shroud 15. Although this arrangement requires two blowers, and thus would be more expensive than the system of FIG. 5, the temperature of the air in the system will be lower since only ambient temperature air is supplied to blower 30 to be introduced into the system. The choice of which system will be used will be largely determined by the effect of temperature on the fruit being harvested.

As described above, air under pressure is supplied to the shroud 15 by blower 23 or 30, the suction member is connected to the subatmospheric pressure of the separator 22, and the system adjusted so that a greater volume of air is supplied to the shroud than is taken in through the suction member. In FIGS. 2 and 3 the air flow in the nozzle is indicated by the arrows. The suction member 11 and shroud 15 have complementary enlarged curved portions 31 and 32 adjacent the open ends thereof so that the air flowing through the shroud 15 will flow completely around the periphery of the open suction member end and be directed in a converging amnner towards the axis of the suction member. Since a greater volume of air is being supplied to the shroud than can be taken in by the suction member, part of the converging air from the shroud will be sucked into the suction member while the remainder of the air will be blown away from the nozzle. The air flow from the shroud into the suction member will thus create a null pressure interface, generally indicated at 33, separating the subatmospheric pressure in the throat 34 of the suction member and the superatmospheric pressure of the air blown from the nozzle.

The location of the null pressure interface 33 in the nozzle can be varied, as desired, by the angle of the open end 16 of the shroud. For example, if the shroud end 16 were inclined outwardly from the suction member, as indicated at 16' in FIG. 2, the air flow from the shroud would converge towards the axis of the suction member at a point further from the throat of the suction member and the null pressure interface would be moved further from the suction member throat, but still axially thereof. Conversely, if the shroud end 16 were inclined in an opposite direction, the null pressure interface would be moved into the throat of the suction member.

In operation, the workman thrusts the nozzle towards the fruit to be picked. The excess of pressure air from the shroud will discharge generally axially from the nozzle and will blow away dust, loose leaves and insects from the fruit as the nozzle approaches. The nozzle is now manipulated so that the fruit on the tree or vine passes through the null pressure interface and into the throat of the suction member wherein the fruit is now acted upon solely by the suction in that member, causing the fruit to be pulled from its stems and sucked through hose 21 to the separator 22. At the same time, the pressure air in the shroud will still be blown away from the nozzle so that the leaves behind the fruit will not be pulled into the suction member.

Thus, the picking nozzle will only operate upon material which is actually passed through the null pressure interface into the throat of the suction member, and will not take in objects above the null pressure interface.

If desired, the air flow in the shroud and suction member could be regulated, by means of the valve 29, or by adjustment of the two blowers 23 and 30, depending on whether the system of FIG. 5 or FIG. 6 is used, so that all of the air from the shroud is taken into the suction member and so that all of the air taken into the suction member comes from the shroud. Again, there would be a null pressure interface at the open end of the suction member separating the subatmospheric pressure in the suction member from atmospheric pressure outside of the nozzle and no air from outside of the nozzle would enter the suction member. At the same time, no air from the shroud would be blown away from the nozzle. Such an adjustment would eliminate the cleaning action on the fruit prior to picking, but it would still provide the desired result of having the nozzle act only on objects actually introduced into the suction member throat through the null pressure interface 33.

Thus, to prevent the taking in of leaves as the fruit is picked, it is necessary to operate the system so that the volume rate of flow of air in the shroud is at least equal to the volume rate of flow of air taken in by the suction member. An increase in air flow through the shroud will produce an outward air flow for cleaning purposes.

FIGS. 7 and 8 illustrate a modification of the nozzle 10 wherein the vanes 36, mounted between the shroud and suction member, are curved so that the air blown through the shroud and issuing from the open end thereof is caused to swirl in a converging spiral pattern towards the axis of the nozzle, as indicated by the arrows on FIG. 8. The swirling air will consequently follow a swirling path as it is sucked into the suction member. This swirling action of the air in the suction member throat will impart a centrifugal force to the grapes in a bunch inserted into the suction member throat, causing them to be spread apart so that the grapes may be pulled more easily from the stems.

The air flow in the system can, as indicated above, be adjusted so that the fruit can be pulled from the stems so that a later removal of the stems from the fruit can be eliminated. However, if it is desired to pick a whole bunch of grapes without pulling the grapes from the stems, the air flow can be reduced, and the stalk can be severed by a suitable knife mechanism mounted on the periphery of the nozzle and actuated by the workman, or by a knife held in one hand of the operator, as the fruit is inserted into the suction member throat. The fruit, with stems, will then be sucked through the suction member and hose 21 to the separator.

The present nozzle also has a significant safety advantage over the type nozzle shown in the above-referred-to Gallo patent. In said patent, the nozzle is no more than a suction member which operates at a high-volume rate of flow, e.g., about 1500 cubic feet of air per minute. This nozzle produces a tremendous amount of suction, and there is no protection against the clothing or body of the workman being sucked into or against the nozzle end during the picking operation. If the nozzle were to come close to the face of the workman, the workman's face could be drawn against the nozzle and the air could be literally sucked from his lungs, causing either severe injury or death.

However, with the nozzle of the present invention, there is no suction effect above the null pressure interface, and nothing is acted upon unless it is deliberately passed through the null pressure interface into the suction member throat. Indeed, when the apparatus is adjusted to produce an outwardly flowing cleansing air action, if the workman should accidentally get the nozzle near his hands or face, the outwardly flowing air will cause him instinctively to draw back from the nozzle, thus preventing any injury to himself.

It is to be understood that the various forms of the invention specifically illustrated and described are only preferred embodiments of the same and that various changes in the shape, size and arrangement of parts may be resorted to without departing from the spirit of the invention or the scope of the attached claims.

For example, for grape-picking purposes, the throat of the suction member is preferably about four inches in diameter. Other sizes of the suction member may be found to be preferable for other fruits. Additionally, the suction required to pick different fruits may vary, and the ratios of pressure air and suction air may vary for different fruits and different picking conditions. Similarly, the shape of the open concentric ends of the shroud and suction member may be varied to direct the pressure air outwardly or inwardly of the suction member throat to accommodate different picking conditions. In all cases, however, the volume rate of flow of pressure air will at least equal, and usually exceed, the volume rate of flow of the suction air so that the air sucked into the suction member will be supplied completely from the pressure air in the shroud.

Having thus described our invention, we claim:

1. In a fruit-harvesting apparatus:
   (a) a tubular suction member having an open end and a suction end,
   (b) a tubular shroud mounted on and spaced around said suction member, said shroud having a pressure end and having an open end projecting beyond the open end of said suction member coaxially with respect thereto,
   (c) said suction member and shroud being shaped so that air flowing under pressure into the pressure end of said shroud is directed from the open end of said shroud towards the axis of said suction member and transversely of said open end thereof so as to be sucked into said open end of said suction member.

2. In a fruit-harvesting apparatus as set forth in claim 1, and further including:
   (d) means mounted between said shroud and said suction member for directing air discharged from the open end of said shroud in a swirling pattern relative to and towards the axis of said suction member.

3. In a fruit-harvesting apparatus as set forth in claim 1, and further including:
   (d) means connected to the suction end of said suction member and to the pressure end of said shroud for sucking air through said suction member from the open end thereof and for blowing air under pressure into said shroud and in which said means blows air into said shroud at a volume rate at least as great as the volume rate of air sucked through said suction member.

4. In a fruit-harvesting apparatus as set forth in claim 3, and wherein said last-named means (d) blows air into said shroud at a greater volume rate of flow than the volume rate of flow sucked through said suction member.

5. In a fruit-harvesting apparatus as set forth in claim 4, and further including:
   (e) means mounted between said shroud and said suction member for directing air discharged from the open end of said shroud in a swirling pattern relative to and towards the axis of said suction member.

6. In a fruit-harvesting apparatus:
   (a) a tubular suction member having an open end and a suction end;
   (b) an air-directing member having an open end and a pressure end;
   (c) means connected to said suction end of said suction member and to said pressure end of said air-directing member for sucking air through and from said suction member only and for blowing air under pressure through said air-directing member and in which said means blows air through said air-directing member at a volume rate of flow at least as great as the volume rate of flow of air sucked from said suction member;
   (d) said open end of said air-directing member being operatively associated with said open end of said suction member so that substantially all of the air sucked through said suction member is supplied from said air-directing member.

7. In a fruit-harvesting apparatus as set forth in claim 6 and wherein said means (c) blows air through said air-directing member at a greater volume rate of flow than the volume rate of flow sucked through said suction member.

8. In a fruit harvesting apparatus as set forth in claim 7 and further including means operatively associated with said suction and air-directing members for directing air discharged from the open end of said air-directing member in a swirling pattern relative to and towards the axis of said suction member.

References Cited

UNITED STATES PATENTS

| 1,253,774 | 1/1918 | Boig | 56—32 |
| 1,278,175 | 9/1918 | Le Baron | 56—330 |
| 2,653,438 | 9/1953 | Ramirez | 56—32 |
| 2,688,835 | 9/1954 | Rawson | 56—32 |

RUSSELL R. KINSEY, Primary Examiner

U.S. Cl. X.R.

56—32; 302—21